United States Patent Office 3,839,465
Patented Oct. 1, 1974

---

3,839,465
PRODUCTION OF HYDROXYETHYL ETHERS OF BUTYNE-2-DIOL-1,4
Kurt Schneider, Limburgerhof and Friedrich Hovemann, Hockenheim, Germany, assignors to Badische Anilin- & Soda-Fabrik Aktiengesellschaft, Ludwigshafen (Rhine), Germany
No Drawing. Filed July 8, 1971, Ser. No. 160,909
Claims priority, application Germany, July 22, 1970,
P 20 36 278.1
Int. Cl. C07c *41/02, 41/06, 43/19*
U.S. Cl. 260—615 B                   3 Claims

ABSTRACT OF THE DISCLOSURE

Production of hydroxyethyl ethers of butyne-2-diol-1,4 by reacting butyne-2-diol-1,4 with ethylene oxide in the presence of basic ion exchanger resins.

---

This invention relates to a process for the production of very pure hydroxyethyl ethers of butyne-2-diol-1,4 by reaction of butyne-2-diol-1,4 with ethylene oxide.

The manufacture of these products has hitherto been carried out according to the teaching of U.S. Pat. 3,366,-557 and the analogous teaching of U.S. Pat. 3,293,191 by causing an alkynol to react with ethylene oxide or some other epoxide compound in the presence of a basic catalyst. Basic catalysts used have been alkali or alkaline earth metal hydroxides, alcoholates or tertiary amines. The reaction products of butyne-2-diol-1,4 with ethylene oxide as obtained by these processes have been found to be valuable as brighteners in nickel-electroplating baths for the production of very bright deposits.

However, the use of the hydroxyethyl ethers of butyne-2-diol-1,4 as prepared by the above processes has been found to have a number of important disadvantages in bright nickel-plating techniques. High molecular weight by-products are formed in the ethoxylation of commercial butyne-diol by the aforementioned processes, as is mentioned, for example, in the cited U.S. Pat. 3,366,557 in column 9, Table 7. These by-products are insoluble in commercial nickel baths and prevent, to some extent, the formation of a bright nickel deposit. Attempts have been made to prevent the formation of high molecular by-products by using trimethylamine or triethylamine as catalyst, these being weaker bases than alkali metal hydroxides, but it was found that these comparatively weakly basic catalysts required higher temperatures than were necessary when using strongly basic catalysts. The use of higher temperatures, however, assisted the formation of the undesirable by-products.

It is further known that the purity of the butyne-2-diol-1,4 is an important factor contributing to the suppression of high molecular weight by-product formation, the basicity of the catalyst being less significant. For example, when butyne-2-diol-1,4 which has been purified by vacuum distillation is reacted with ethylene oxide in the presence of alkali metal hydroxides as catalysts, less undesirable polymeric products are formed. It is also recommended to maintain a reaction temperature of between 40° and 60° C.

Although it has thus been shown that butyne-diol which has been purified by distillation, when reacted with ethylene oxide in the presence of any of the known basic catalysts, can be converted to a hydroxyethyl ether which is free from high molecular weight by-products, the use of the known basic catalysts still has a serious drawback. This is that the hydroxyethyl ether of the butyne-diol is contaminated by the catalyst. The catalyst is insoluble in the reaction product and, after relatively long storage periods, is virtually incapable of dissolving in the nickel bath. In other words, the catalyst causes similar trouble to that described above in respect of the high molecular weight by-products produced in the ethoxylation of butyne-diol. Moreover, the nickel bath to which these agents are added shows a gradual increase in the alkali metal ion or trialkyl ammonium ion concentration therein. It is not possible to remove these ions from the bath by the usual purifying process involving filtration through charcoal. However, the presence of alkali metal ions or trialkyl ammonium ions in the nickel bath is undesirable because they give rise to the deposition of rough and brittle nickel deposits (see the monograph by R. Brugger: "Die galvanische Vernickelung" published by Eugen G. Leuze—Verlag, Saulgau, Württemberg, Germany (1969), p. 131).

It is an object of the present invention to provide a method of producing hydroxyethyl ethers of butyne-2-diol-1,4 by reacting purified butyne-2-diol-1,4 with ethylene oxide in the presence of basifying agents, which hydroxyethyl ethers are not only free from polymeric by-products but are also free from residues of basic catalyst conducive to subsequent polymerization, and which may be produced at a reasonable rate under mild thermal conditions.

It is a further object of the invention to provide a process for the production of flawless nickel coatings having superior brightness.

We have found that hydroxyethyl ethers of butyne-2-diol-1,4 of the formula:

$$HO(H_4C_2O)_x—CH_2—C\equiv C—CH_2(OC_2H_4)_xOH$$

in which $x$ is one of the integers 1 to 3, are obtained in the desired purity and stability by using a basic ion exchanger resin as basifying agent. In this way there is obtained an ethoxylated butyne-diol of the above formula in which $x$ is one of the integers 1 to 3 and preferably 1.

A suitable starting material for the process of the invention is a butyne-2-diol-1,4 which has been freshly purified by distillation for example.

Distillation of commercial butyne-diol is conveniently carried out under reduced pressure (about 2 mm. of Hg) and at temperatures of from about 120° to 130° C.

The other starting product is ethylene oxide most conveniently added to the butyne-diol in the stoichiometric amount dictated by the above formula, from 2 to 6 and preferably from 2 to 2.05 moles of ethylene oxide being used per mole of butyne-diol.

The basifying agents used are basic anion exchanger resins. Suitable anion exchangers include all of the commercial products, provided they contain quaternary ammonium groups. These products are organic polymers which are partially crosslinked and therefore insoluble in the usual solvents such as hydrocarbons, halohydrocarbons, alcohols, ethers and carboxylates, which polymers carry, for example, groups of the formula

which are attached to the backbone through a carbon atom, the symbols R, R' and R" denoting alkyl radicals optionally substituted by hydroxyl or alkoxy. In the readily available commercial products the radicals R, R' and R" are preferably methyl and β-hydroxyethyl groups. However, polymers containing groups of the formula:

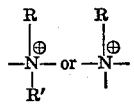

within the macromolecule may also be used. For details on the production of these various strongly basic anion exchangers reference is made to the appropriate chapters in the monograph by F. Helffrich "Ionenaustauscher," published by Verlag-Chemie, Weinheim/Bergstrasse, Germany (1959).

We prefer to use ion exchanger resins which are based on organic polymers based on polystyrene and divinyl benzene as crosslinking components. These polymers carry the groups of the formulae given above, attached to the carbon atoms.

These high molecular weight polymers are produced by the known method of reacting the nitrogen-free polymers, as matrix, with the appropriate primary, secondary or tertiary amines as described in the cited monograph.

Where polystyrene/divinyl benzene polymers are used, it is preferred to react these with tertiary amines to produce polymers having the groups of the first formula given above. Commercial products in this preferred latter group of exchanger resins are for example "Amberlite" IRA 400, "Amberlyst" A 26 and "Amberlite" IRA 900 produced by Röhm & Haas GmbH, Germany ("Amberlite" and "Amberlyst" are registered trademarks).

These anion exchanger resins are generally available commercially in the form of salt-like compounds containing, as counter-ion to the positively charged nitrogen atom, chloride, bromide, sulfate, acetate, formate or preferably cyanide, alcoholate or hydroxyl ions. For the purposes of the invention it is convenient to use compounds containing cyanide, alcoholate or hydroxyl ions, so that they may function as bases to the desired extent. On a commercial scale, it has been found advantageous to use anion exchanger resins containing hydroxyl ions.

The amount of these anion exchanger resins which is added to the reactants is not critical, since the anion exchanger resins are high molecular weight compounds which are readily removed by filtration. It has been found convenient to add from about 10 to 40% by weight of basic ion exchanger resin, based on the weight of butyne-2-diol-1,4.

The process may be carried out for example as follows: the butyne-2-diol-1,4 is charged to an autoclave together with the exchanger resin in the proportions specified and ethylene oxide is continuously fed to the autoclave at the rate specified, during which operation the pressure may rise to about 2 to 3 atmospheres gage. The ethylene oxide feed is effected over from 8 to 16 hours and preferably from 11 to 13 hours at a temperature of from 45° to 60° C. and preferably from 50° to 55° C. The system is then left to stand at the stated temperature until the pressure remains constant. The exchanger resin is then filtered off and can be subsequently reused.

The product has a yellow to light brown color, contains less than 0.1% of impurities and is exceptionally stable.

The products produced by the process of the invention may be highly successfully used as brighteners in the electrodeposition of nickel.

If a Watts nickel plating bath of the composition given in U.S. Pat. 3,366,557 is taken and there is added, instead of the hydroxyethyl ether obtained by following the instructions given in that patent, the product produced by the process of the invention, the nickel coating obtained has a high degree of brightness and a flawless mirror finish.

In the following examples, the teaching of the invention is illustrated and compared with the prior art as described in U.S. Pat. 3,366,557. The parts are by weight unless otherwise specified.

EXAMPLE 1 (PRIOR ART)

860 parts (10 molar equivalents) of butyne-2-diol-1,4 are charged to a 3 liter autoclave of stainless steel and 5 parts of powdered potassium hydroxide are added. The autoclave is sealed and flushed with nitrogen, after which 889 parts (20.2 molar equivalents) of ethylene oxide are continuously fed in over 12 hours at from 50° to 60° C., during which period the pressure in the autoclave rises to from 2.0 to 2.5 atmospheres gage. The reaction is allowed to continue at this temperature until the pressure remains constant, whereupon the catalyst is neutralized with acetic acid.

The resulting bis(hydroxyethyl) ether of the butyne-diol contains, in addition to the potassium acetate produced during neutralization, from 0.6 to 0.8% of free butyne-diol and small quantities of polyether compounds. The color of the product is dark brown, its color number is more than 500 APHA and its refractive index $n_D^{20} = 1.4834$.

A Watts nickel electrolyte of the following composition:

300 g./l. of nickel sulfate ($NiSO_4.7H_2O$)
45 g./l. of nickel chloride ($NiCl.6H_2O$)
41 g./l. of boric acid ($H_3BO_3$)

is prepared and 0.4 g./l. of the reaction product obtained by the above method is added together with 4 g./l. of 1,3-benzene-disulfonic acid and 2.0 g./l. of the sodium salt of lauryl alcohol bis($\beta$ - hydroxyethyl-ether)-sulfate of the formula:

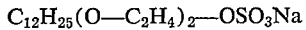

$$C_{12}H_{25}(O-C_2H_4)_2-OSO_3Na$$

Degreased brass plates of the quality Ms 63 are then nickel-plated in this bath in a parallel cell at a temperature of 60° C. and a current density of 5 amps/dm.². There is thus obtained an imperfect nickel coating having a rough surface of poor brightness.

EXAMPLE 2 (INVENTION)

860 parts (10 moles) of butyne-2-diol-1,4 are charged to an autoclave together with 100 parts of a basic ion exchanger resin of the kind known as Amberlite IRA 400 (in the hydroxyl ion form) and the whole is reacted at from 50° to 60° C. with ethylene oxide by the method described in Example 1. The ion exchanger resin is filtered off and there is obtained the yellow to light brown bis(hydroxyethyl) ether of the butyne-diol, which contains less than 0.1% of free butyne-diol. The color number is 100 to 120 APHA and the refractive index $n_D^{20}$ is 1.4845.

A nickel coating is produced by the electroplating technique described in Example 1 but using the product produced by the process of the invention. There is thus obtained a uniformly bright nickel coating having a flawless mirror finish.

EXAMPLE 3 (INVENTION)

860 parts (10 moles) of butyne-2-diol-1,4 are charged to an autoclave together with 200 parts of a basic ion exchanger resin of the kind known as Amberlyst A 26 (in the hydroxyl ion form) and the whole is reacted at from 45° to 55° C. with ethylene oxide by the method described in Example 1. The ion exchanger resin is filtered off and there is obtained the yellow to light brown bis (hydroxyethyl) ether of the butyne-diol, which contains less than 0.1% of free butyne-diol. The color number is 110 to 120 APHA and the refractive index $n_D^{20}$ is 1.4844.

EXAMPLE 4 (INVENTION)

1,000 parts of Amberlite IRA 900 (in the hydroxyl ion form) are placed in a pressure tube, and a mixture of 86 parts (1 mole) of butyne-2-diol-1,4 and 90 parts of ethylene oxide is pumped in per hour at a pressure of 6 atmospheres gage and a temperature of 50° to 60° C. controlled by means of a cooling cycle. 170 parts of the yellow bis(hydroxyethyl) ether of the butyne-diol is obtained per hour, which contains less than 0.1% of free butyne-diol. The color number is 100 to 110 APHA and the refractive index $n_D^{20}$ is 1.4845.

The products of Examples 3 and 4 are used for nickel electroplating by the method of Example 1. A very bright coating is obtained which shows an excellent mirror finish.

We claim:
1. In a process for the production of hydroxyethyl ethers of butyne-2-diol-1,4 of the formula

$$HO(H_4C_2O)_x—H_2C—C\equiv C—CH_2—(OC_2H_4)_xOH,$$

in which $x$ is one of the integers 1 to 3, by reacting purified butyne-2-diol-1,4 with ethylene oxide in the presence of basifying agents, the improvement which comprises carrying out the reaction by charging the butyne-diol into an autoclave together with a basic ion exchanger resin as basifying agent and feeding ethylene oxide continuously to the autoclave for from 8 to 16 hours at a reaction temperature of from 45° to 60° C., the reaction mixture then being left to stand at said temperature until the pressure remains constant, said ion exchanger resin being a partially crosslinked organic polymer based on polystyrene and divinyl benzene as cross-linking components said polymer carrying nitrogen-containing groups of the formulae

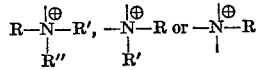

in the macromolecule, in which R, R' and R" denote methyl or β-hydroxyethyl, the free valences being attached to the macromolecule through carbon atoms.

2. A process as claimed in Claim 1, wherein the ion exchanger resin is one carrying a group of the formula

as the essential nitrogen-containing group.

3. A process as claimed in Claim 1 wherein said reaction temperature is from 50° to 55° C.

References Cited
UNITED STATES PATENTS

| | | | |
|---|---|---|---|
| 3,366,557 | 1/1968 | Foulke et al. | 204—49 |
| 2,852,566 | 9/1958 | Jeltsch | 260—615 B |
| 3,053,903 | 9/1962 | Holland | 260—615 B |
| 3,644,535 | 2/1972 | Batty et al. | 260—615 B |
| 2,792,382 | 5/1957 | Edmonds | 260—615 B |
| 2,716,137 | 8/1955 | Patton | 260—615 B |
| 3,328,467 | 6/1967 | Hamilton | 260—615 B |

OTHER REFERENCES

Astle, Ion Exchangers in Organic and Biochemistry, by Calmon et al., Interscience Publishers Inc., New York (1957).

Reed et al., Ind. & Eng. Chem. 48, No. 2, 205–208, 1956.

HOWARD T. MARS, Primary Examiner

U.S. Cl. X.R.

204—49; 260—615 R